JANE E. GILMAN.
Work Holder.
No. 4,811.
Reissued March 19, 1872.
Fig. 1
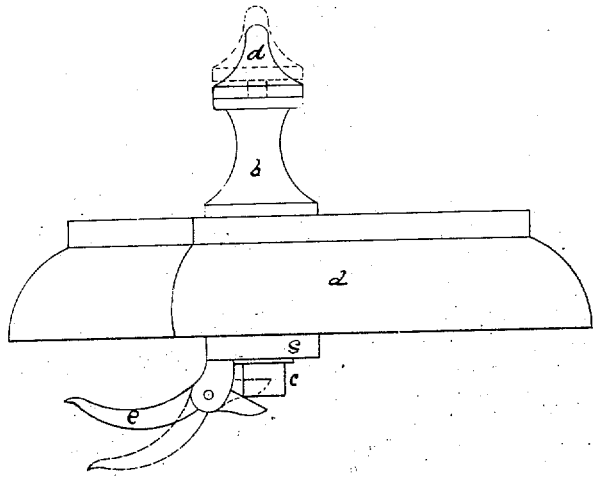
Fig. 3
Fig. 2
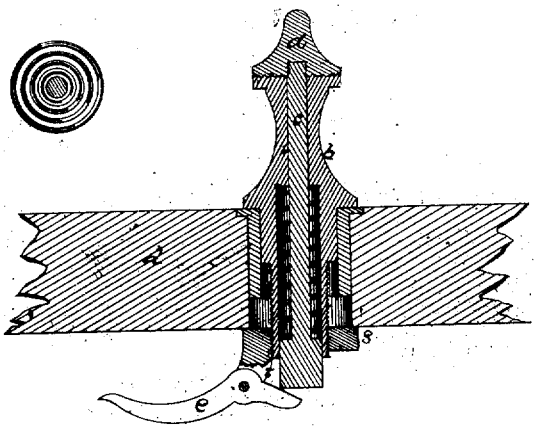
Witnesses.
Joseph Jordan Jr.
A. S. Hirschel
Inventor.
Jane E. Gilman
by W. E. Simmons.
Solicitor Hartford Conn.

UNITED STATES PATENT OFFICE.

JANE E. GILMAN, OF HARTFORD, CONNECTICUT.

IMPROVEMENT IN WORK-HOLDERS.

Specification forming part of Letters Patent No. 102,534, dated May 3, 1870; reissue No. 4,811, dated March 19, 1872.

SPECIFICATION.

I, JANE E. GILMAN, of Hartford, in the county of Hartford and State of Connecticut, have invented an Improved Work-Holder, of which the following is a specification, reference being had to the accompanying drawing, in which—

Figure 1 is a side elevation of my invention fixed to the corner of a table. Fig. 2 is a central vertical section of the same. Fig. 3 is a view of the top or face of the standard, showing its corrugations.

My invention is designed for holding cloth while being sewed, and for other like purposes.

The letter *a* indicates the table; *b*, the main standard, hollow through its center, in which slides the piston *c*, which is fastened at the top into the cap *d*. The piston *c* is held down firmly by the spiral compression spring *i*. The piston and the cap *d* with it can be raised by pressing down on the long end of the lever *e* beneath the table, and when this is done, as indicated by dotted lines in Fig. 1, the cap is raised, as indicated by dotted lines in the same figure, so that cloth can be introduced between it and the top of the standard. On releasing the lever *e* the cap *d* comes smartly down upon the standard, and holds firmly any cloth placed between. The lower surface of the cap and the top of the standard (seen in Fig. 3) are corrugated, so as to increase the holding power. The standard *b* may be set directly into a round hole in the table, or the hole may, as in the drawing, be bushed with metal. The standard is held firmly in place by a nut, *s*, screwed on its lower end, and bearing up against the under side of the table. On this nut are bearings *r* for the lever *e*, when this lever is used. This lever may be omitted where not much holding power is required, in consequence of which the spring may be made to press more lightly, and then the piston can be elevated by simple pressure of the finger upward on the lower end of the piston. And where the article is intended for men's use, who are stronger than women, the lever may be omitted. When the lever is omitted the piston should be elongated somewhat, and its lower end expanded into a button.

I claim as my invention—

1. The combination of the standard *b*, the piston *c* with its cap *d*, and the spring *i*, constructed, arranged, and operating substantially as described, for the purpose set forth.

2. The combination of the standard *b*, the piston *c* with its cap *d*, the spring *i*, and the lever *e*, the whole constructed substantially as described, for the purpose set forth.

3. The combination of the standards *b*, the piston *c* with its cap *d*, the spring *i*, and the nut *s*.

4. The combination of the standard *b* and piston *c*, operated substantially as described, the opposed faces of the cap and standard having roughened surfaces, substantially as described.

JANE E. GILMAN.

Witnesses:
WM. E. SIMONDS,
S. J. SIMONDS.